United States Patent
Byrd

(10) Patent No.: US 12,542,692 B2
(45) Date of Patent: Feb. 3, 2026

(54) GENERAL SYSTEMS CONTROLLER GATEWAY

(71) Applicant: gEncompass, LLC, Wilmington, NC (US)

(72) Inventor: Dean E. Byrd, Wilmington, NC (US)

(73) Assignee: gEncompass, LLC, Wilmington, NC (US)

( * ) Notice: Subject to any disclaimer, the term of this patent is extended or adjusted under 35 U.S.C. 154(b) by 0 days.

(21) Appl. No.: 18/436,520

(22) Filed: Feb. 8, 2024

(65) Prior Publication Data

US 2024/0275633 A1 Aug. 15, 2024

Related U.S. Application Data

(60) Provisional application No. 63/444,476, filed on Feb. 9, 2023.

(51) Int. Cl.
*H04L 12/40* (2006.01)

(52) U.S. Cl.
CPC .... *H04L 12/40* (2013.01); *H04L 2012/40215* (2013.01); *H04L 2012/40228* (2013.01)

(58) Field of Classification Search
CPC ........... H04L 12/40; H04L 2012/40215; H04L 2012/40228
See application file for complete search history.

(56) References Cited

U.S. PATENT DOCUMENTS

| | | | |
|---|---|---|---|
| 10,234,853 B2 | 3/2019 | Mukkamala et al. | |
| 11,042,131 B2 | 6/2021 | Strohmenger et al. | |
| 11,240,311 B2 | 2/2022 | Binder et al. | |
| 11,449,024 B2 | 9/2022 | Ackmann et al. | |
| 2008/0240930 A1* | 10/2008 | Palka | E21B 43/127 417/42 |
| 2010/0292823 A1* | 11/2010 | Biester | C21D 11/00 700/103 |
| 2012/0105002 A1* | 5/2012 | Eikeland | H02J 50/05 320/109 |
| 2016/0336762 A1* | 11/2016 | Hunter | H01M 10/46 |
| 2018/0092313 A1* | 4/2018 | Avrahamy | H05B 47/19 |
| 2020/0348662 A1 | 11/2020 | Cella et al. | |
| 2020/0395627 A1* | 12/2020 | Kilburn | H02J 7/00714 |
| 2022/0353955 A1 | 11/2022 | Harper et al. | |

FOREIGN PATENT DOCUMENTS

| | | | |
|---|---|---|---|
| CN | 2423566 Y | * | 3/2001 |
| WO | 2022106885 | | 5/2022 |

OTHER PUBLICATIONS

Translation of CN-2423566-Y (Year: 2001).*
Caldwell et al., Robotics and automation in the food industry, Dec. 31, 2013.
Kocovic et al., Internet-of-Thing for Consumer Electronics (IoT4CE), Feb. 28, 2022.

* cited by examiner

*Primary Examiner* — Henry Tsai
*Assistant Examiner* — John B Roche
(74) *Attorney, Agent, or Firm* — Breiner & Breiner, L.L.C.

(57) ABSTRACT

The disclosed invention relates to a general systems controller gateway. More particularly, the invention relates to a general systems controller gateway that allows equipment such as fossil fuel and electrical generators, refrigeration units, water pumps, engines and the like to be remotely started, stopped, monitored, controlled and located by a technician.

18 Claims, 21 Drawing Sheets

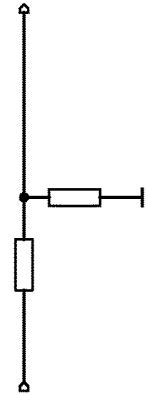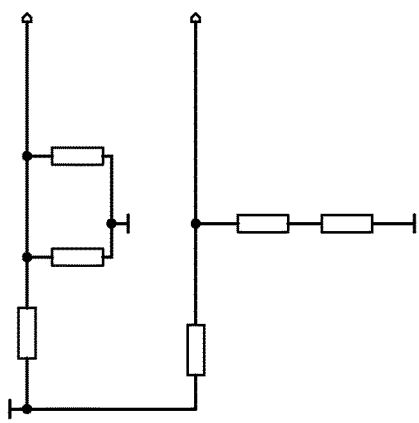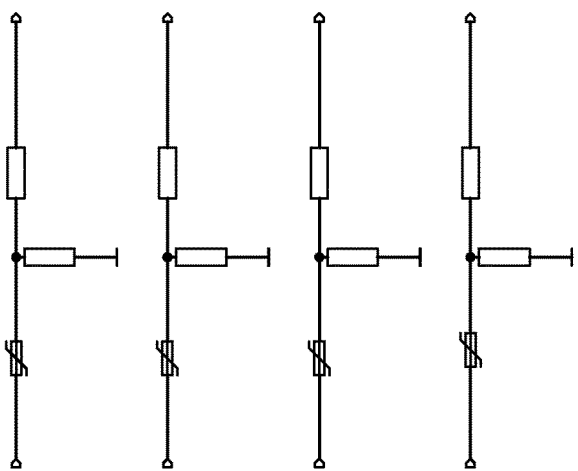
FIG. 9

TELEMETRY PARAMETER DEFINITION

```
{
  "payload_version": 1,
  "config_name": "Database",
  "config_version": "0.1",
  "database_subs": [
    {
      "name": "fGenVoltageL1L2",
      "db_type": "float",
      "max_rate": 1000,
      "mqtt_pub_tag": "telemetry",
      "compare_mode": 1,
      "compare_value": 5
    },
    ...
    {
      "name": "fCrankVoltage",
      "db_type": "float",
      "max_rate": 1000,
      "mqtt_pub_tag": "telemetry",
      "compare_mode": 1,
      "compare_value": 0.5
    }
  ]
}
```

*FIG. 16*

MODBUS TCP PARAMETER DEFINITION

```
{
  "payload_version": 1,
  "config_name": "Dief AGC 4",
  "config_version": "1.0",
  "eth0_modbus_tcp": {
    "devices": [
      {
        "ip_address": "192.168.2.2",
        "port": 502,
        "slave_address": 1,
        "session_number": 1,
        "registers": [
          {
            "name": "fGenVoltageL1L2",
            "mb_reg_type": "input",
            "mb_data_type": "sword",
            "reg_number": 502,
            "scale_multiplier": 1,
            "scale_offset": 0
          },
          ...
          {
            "name": "bEngEmgStop",
            "mb_reg_type": "input",
            "mb_data_type": "bit",
            "reg_number": 1011,
            "scale_multiplier": 1,
            "scale_offset": 0,
            "start_bit": 12,
            "num_of_bits": 1
          }
        ]
      }
    ]
  }
}
```

*FIG. 17*

MODBUS RTU PARAMETER DEFINITION

```
{
    "payload_version": 1,
    "config_name": "Dief AGC 4",
    "config_version": "1.0",
    "RS485": {
        "devices": [
            {
                "slave_address": 1,
                "registers": [
                    {
                        "name": "fGenVoltageL1L2",
                        "mb_reg_type": "input",
                        "mb_data_type": "sword",
                        "reg_number": 502,
                        "scale_multiplier": 1,
                        "scale_offset": 0
                    },
                    ...
                    {
                        "name": "bEngEmgStop",
                        "mb_reg_type": "input",
                        "mb_data_type": "bit",
                        "reg_number": 1011,
                        "scale_multiplier": 1,
                        "scale_offset": 0,
                        "start_bit": 12,
                        "num_of_bits": 1
                    }
                ]
            }
        ]
    }
}
```

FIG. 18

J1939 CAN PARAMETER DEFINITION

```
{
  "payload_version": 1,
  "config_name": "Deutz",
  "config_version": "1.0",
  "J1939": {
    "device": [
      {
        "address": 1,
        "registers": [
          {
            "name": "fEngineRPM",
            "PGN": "61444",
            "scale_multiplier": 0.125,
            "scale_offset": 0
            "start_bit": 24,
            "bit_size": 16
          },
          ...
          {
            "name": "fCoolantTemperature",",
            "PGN": "65262",
            "scale_multiplier": 1,
            "scale_offset": -40,
            "start_bit": 0,
            "bit_size": 8}
        ]
      }
    ]
  }
}
```

FIG. 19

GENERAL SYSTEMS CONTROLLER GATEWAY

RELATED APPLICATION

This application claims benefit of U.S. Provisional Patent Application Ser. No. 63/444,476, filed Feb. 9, 2023, entitled "General Systems Controller Gateway," which application is incorporated herein by reference in its entirety.

FIELD OF THE INVENTION

The present invention relates to a general systems controller gateway. More particularly, the invention relates to a general systems controller gateway that allows equipment such as fossil fuel and electrical generators, refrigeration units, water pumps, engines and the like to be remotely started, stopped, monitored, controlled and located by a technician.

BACKGROUND OF THE INVENTION

Systems such as fossil fuel and electrical generators require management and service. Presently, service technicians must be on-site to manage and service generators. This is time-consuming and expensive. There are some known systems that allow devices such as generators to be remotely monitored and/or diagnosed. However, there are no known systems which allow for equipment such as fossil fuel and electrical generators to be remotely started, stopped, monitored, controlled and located by a technician.

The various shortcomings of known devices are addressed by the present invention.

SUMMARY OF THE INVENTION

An object of the present invention is to provide a general systems controller gateway to remotely start, stop, monitor and locate equipment such as, but not limited to, fossil fuel and electrical generators.

Another object of the present invention is to provide a cloud-based general systems controller gateway which allows the monitoring and control of equipment such as, but not limited to, fossil fuel and electrical generators.

Another object of the present invention is to provide an easy-to-use general systems controller gateway for monitoring and control of equipment such as, but not limited to, fossil fuel and electrical generators.

Another object of the present invention is to provide a general systems controller gateway that has the capability of accessing a Controller Area Network (CAN) and controlling the network remotely by cell networks or satellite networks.

Another object of the present invention is to provide a general systems controller gateway that requires no hard-wiring and can plug into a pin rail.

Another object of the present invention is to provide a general systems controller gateway that prohibits access to data and/or information in the event someone steals the gateway equipment.

The invention is directed to a general systems controller (GSC) gateway which allows equipment such as fossil fuel and electrical generators, refrigeration units, water pumps, engines, or the like to be remotely started, stopped, monitored, controlled and located. The GSC gateway (hereinafter referred to simply as "GSC") can communicate with systems using one or more of three data interfaces or can function as a stand-alone unit providing both digital and analog monitoring that can be employed using a combination of both approaches. One aspect of the GSC functionality is that it requests settings from a remote server. This feature alleviates the additional time required during installation, provides the ability to support different OEM systems or accommodate changes in the monitored equipment due to repair or service, and provides an element of "future proofing."

Control and monitoring is achieved by communicating with the GSC via a wireless cell network. The GSC uses a standard method of passing data between itself and the remote server, and this allows for additional functionality or data analysis to be added as required. The GSC capabilities include: Cell Connectivity (cell modem is used to connect the system to the cell network or Internet); GPS (incorporated into the cell modem is the ability to provide location service using both GPS and Glonass constellations with the intent to track location during delivery, equipment servicing and geofencing); Relays (a first "Type C (SPDT) relay functions to control remotely—e.g., to override a local on/off panel switch and access a generator control panel; and a second relay is dedicated for use on systems employing a fuel polisher); Digital Outputs (each independently controlled via remote server); Digital Inputs (each input is reported to the remote server); Analog Inputs (configured for monitoring industry-standard); and a CAN J1939 interface to facilitate communication with engine control units (ECUs).

Interaction with the ECU is configured using settings retrieved from the remote server and preferably monitors basic engine status such as speed, oil pressure, engine hours, active and stored faults, etc. The CAN interface can also send data to the engine such as may be required to control engine speed, clear faults, etc. One or more Ethernet interfaces are available on the GSC system for communicating with systems, and communicating with each other, such as that required for generator synchronization, or to share a high-cost communication network, such as one or more satellites.

These and other objects of the invention will be apparent from the following description of preferred embodiments of the invention and from the accompanying drawings.

BRIEF DESCRIPTION OF THE DRAWINGS

The following detailed description of specific non-limiting embodiments of the present invention can be best understood when read in conjunction with the following drawings, where like structures are indicated by like reference numbers.

Referring to the drawings:

FIG. 9 is a schematic illustration of the Analog Signal conditioning.

FIG. 16 is an example of a Telemetry Parameter definition.

FIG. 17 is an example of a MODBUS TCP Parameter definition.

FIG. 18 is an example of a MODBUS RTU Parameter definition.

FIG. 19 is an example of a J1939 CAN Parameter definition.

DETAILED DESCRIPTION OF PREFERRED EMBODIMENTS

1 Introduction

The GSC allows equipment such as fossil fuel and electrical generators, refrigeration units, water pumps, engines etc. to be remotely started, stopped, monitored, controlled and located. The GSC can communicate with systems using one or more of three data interfaces or can work as a stand-alone unit providing both digital and analog monitoring and control, or can be employed using a combination of both approaches.

Figure 1:
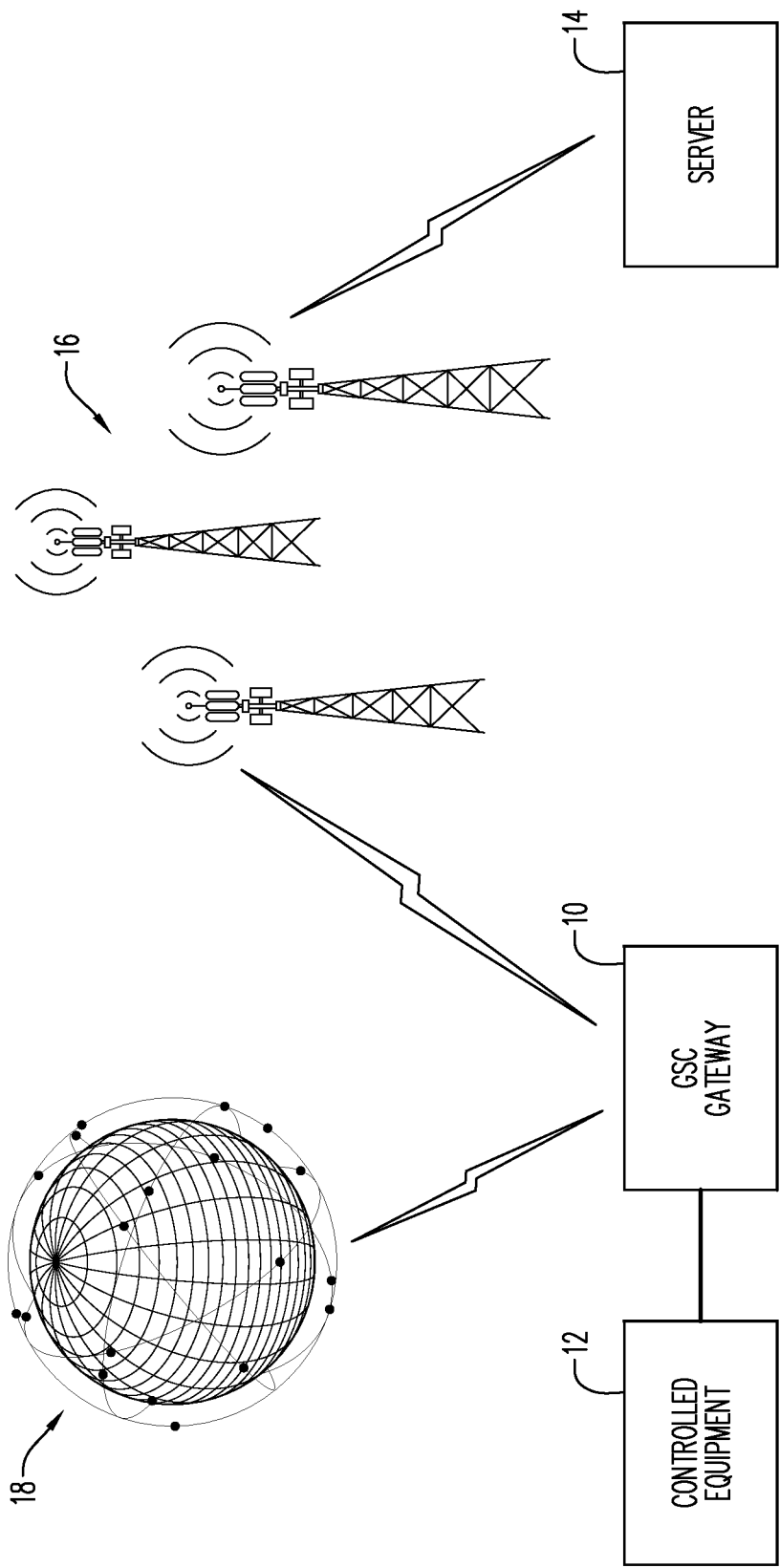
FIG. 1 is an exemplary representation of a system in which a GSC gateway according to the invention can be implemented.

FIG. 1 is a general overview of an exemplary system in which the monitoring and control features of the GSC can be employed. A GSC gateway 10 is connected to the equipment 12 that is to be monitored and controlled. In the discussion that follows, reference is made to the features of the GSC gateway in connection with the monitoring and control of an electrical generator, for illustrative purposes. However, it will be appreciated that the functionality of the GSC gateway is not limited to this particular equipment, but rather is applicable to monitoring and controlling a variety of different types of machines, such as those identified above.

Figure 2:
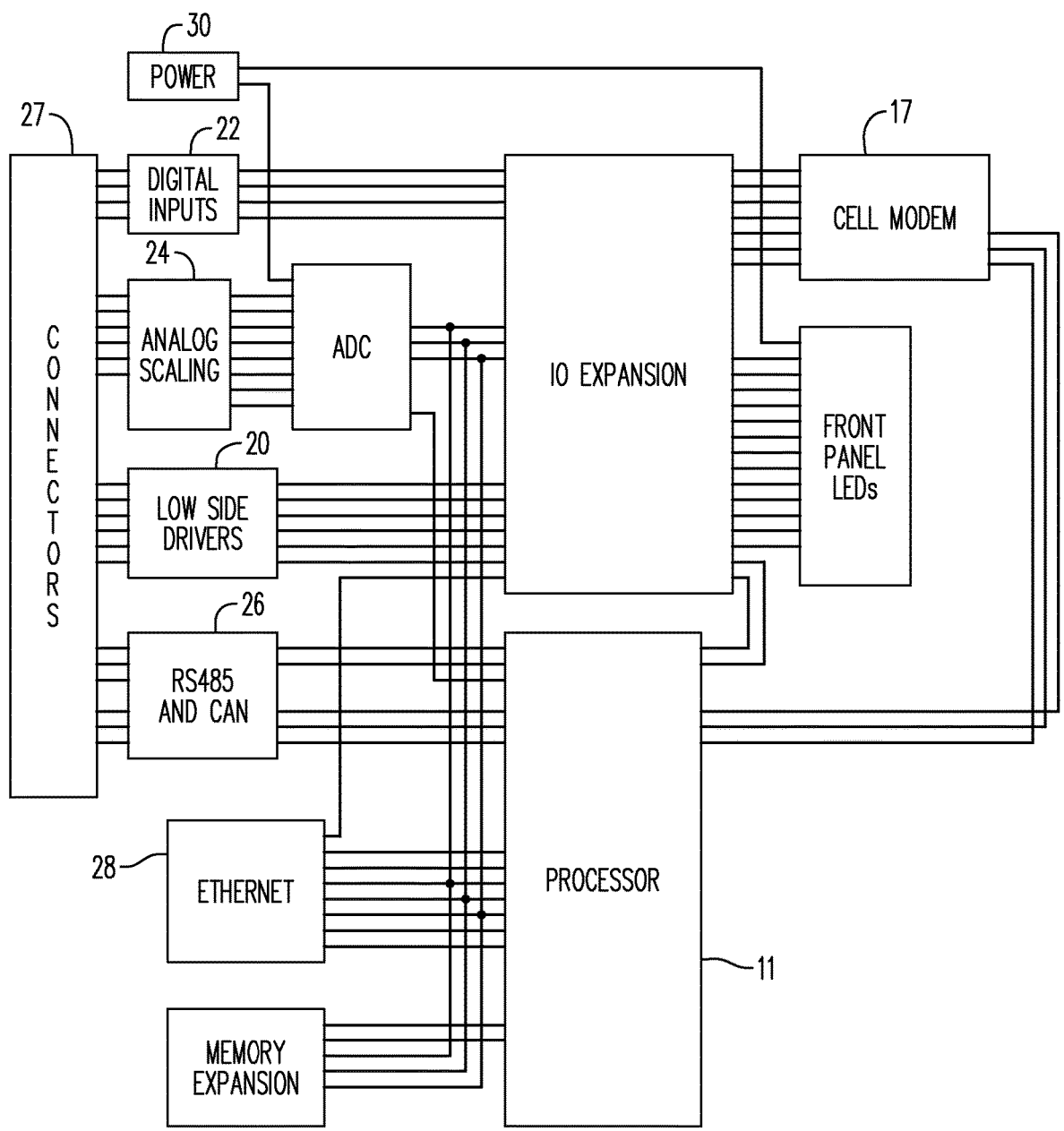
FIG. 2 is a block diagram of the components of the GSC, which are shown in detail in an exemplary embodiment depicted in FIGS. 3-15.

FIG. 2 provides an overview of the components of an exemplary embodiment of the GSC gateway. The functions performed by the gateway are controlled by means of a processor 11. Communications between the gateway and the control unit of an electrical machine are carried out by means of digital outputs, e.g., low side drivers 20, digital inputs 22, and analog inputs 24. As discussed in greater detail hereinafter, the processor can also communicate with the equipment control unit of the electrical machine by means of a CAN interface and/or an RS-485 interface 26.

As illustrated in FIG. 2, each of these various interfaces terminates in a set of connectors 27. Preferably, these terminations are contained in a suitable housing that enables them to be plugged into a pin rail on the equipment control unit of the electrical machine. As such, there is a direct connection between the interfaces of the GSC gateway and the corresponding terminals of the engine control unit. In the context of this disclosure, a "direct" connection is one in which the contacts of the connectors physically engage the terminals of the engine control unit, as opposed to a wireless or other non-physical connection.

In this configuration, the GSC gateway can function as a stand-alone controller that autonomously monitors the operating parameters of the electrical machine via the input terminals, and if a parameter is outside the desired operating range, send a signal on an appropriate output terminal to adjust the operation of the electrical machine, and bring the parameter back within a desired range.

One example of such an operation is monitoring and controlling the charge level of a battery that is employed in the operation of the electrical machine. By monitoring the value of a battery charge parameter at an associated one of the input terminals, the gateway can determine whether the battery charge is within the desired range, by comparison with values stored in the memory of the gateway. If the battery charge level is outside the desired range, the processor sends a command to the equipment control unit to activate a generator, to increase the charge level, or perform an appropriate action to reduce the charge level.

In another example, the gateway processor can monitor a parameter associated with the amount of fuel in the electrical machine.

An additional aspect of the GSC functionality is that it is able to request settings for the particular electrical equipment of interest from one or more remote servers 14. For example, when a piece of equipment is first being installed, the remote server can send the installation specifications and operating parameters that are needed for the installation. This feature alleviates additional time required during installation of the GSC 10, provides the ability to support different OEM systems or accommodate changes in the monitored, controlled equipment due to repair or service, and provides an element of "future-proofing."

Control and monitoring is achieved by communicating between the remote server 14 and the GSC via a wireless cell network 16. The GSC uses a standard method of passing data between itself and the remote server 14, which allows for additional functionality or data analysis to be added as required.

2 Capabilities

2.1 Cell Connectivity

Figure 5:
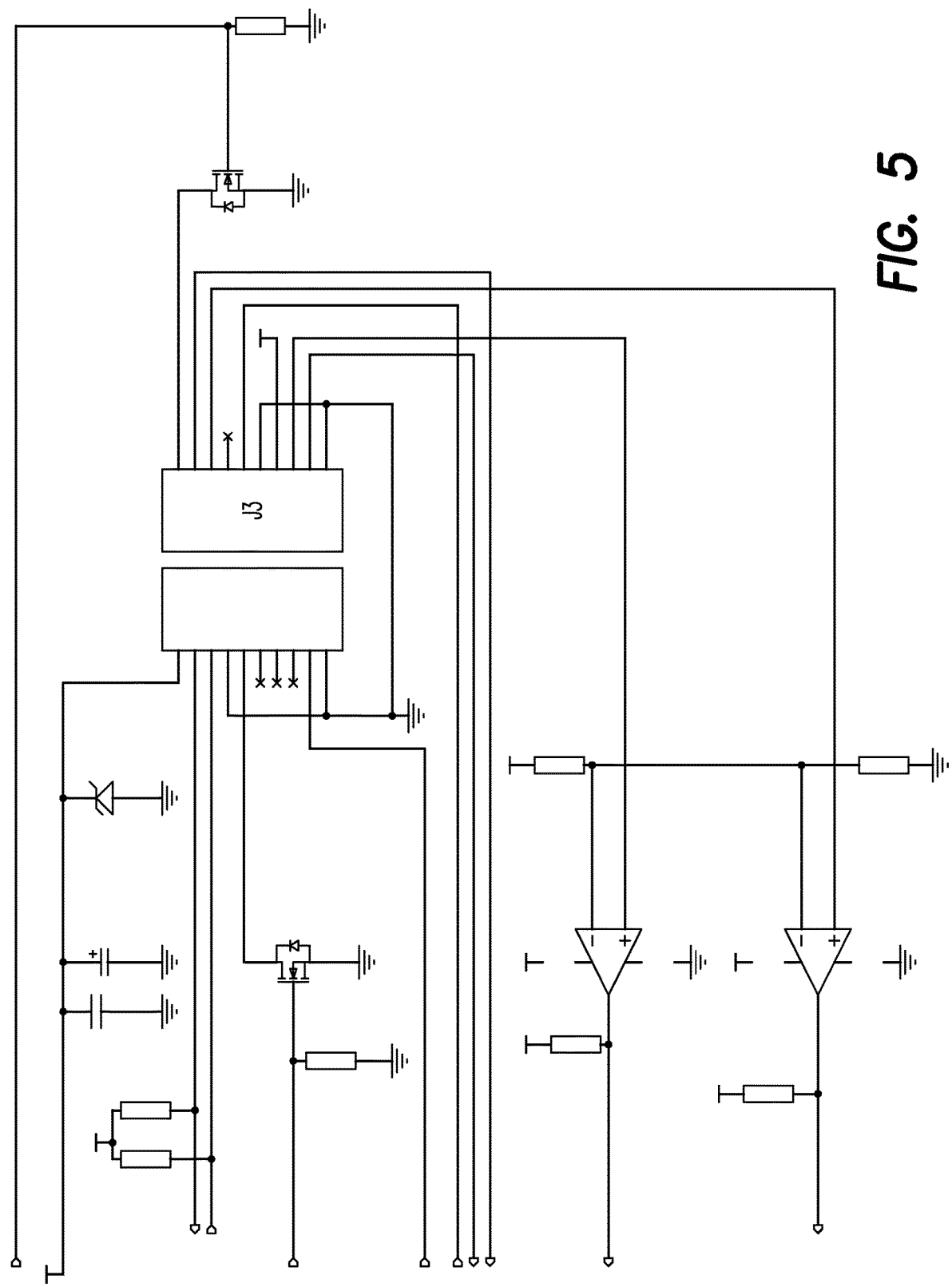
FIG. 5 is a schematic illustration of the LTE modem.

An LTE cell modem 17 is employed to connect the GSC 10 to the cellular network 16 and the Internet. The cellular network provider is defined by a SIM card which is installed into the modem. The SIM card contains credentials for cellular communication within an area in which the GSC operates, e.g., regional, national, international, and the like. A more detailed illustration of the components of a suitable LTE modem 17 is depicted in FIG. 5.

2.2 GPS

Incorporated into the cell modem 17 is the ability to provide location service, e.g., using GPS and/or Glonass satellite constellations 18. The location data is used for tracking the GSC's position, to track location during delivery, assist with equipment servicing, and geofencing.

2.3 Relays

Figure 3:
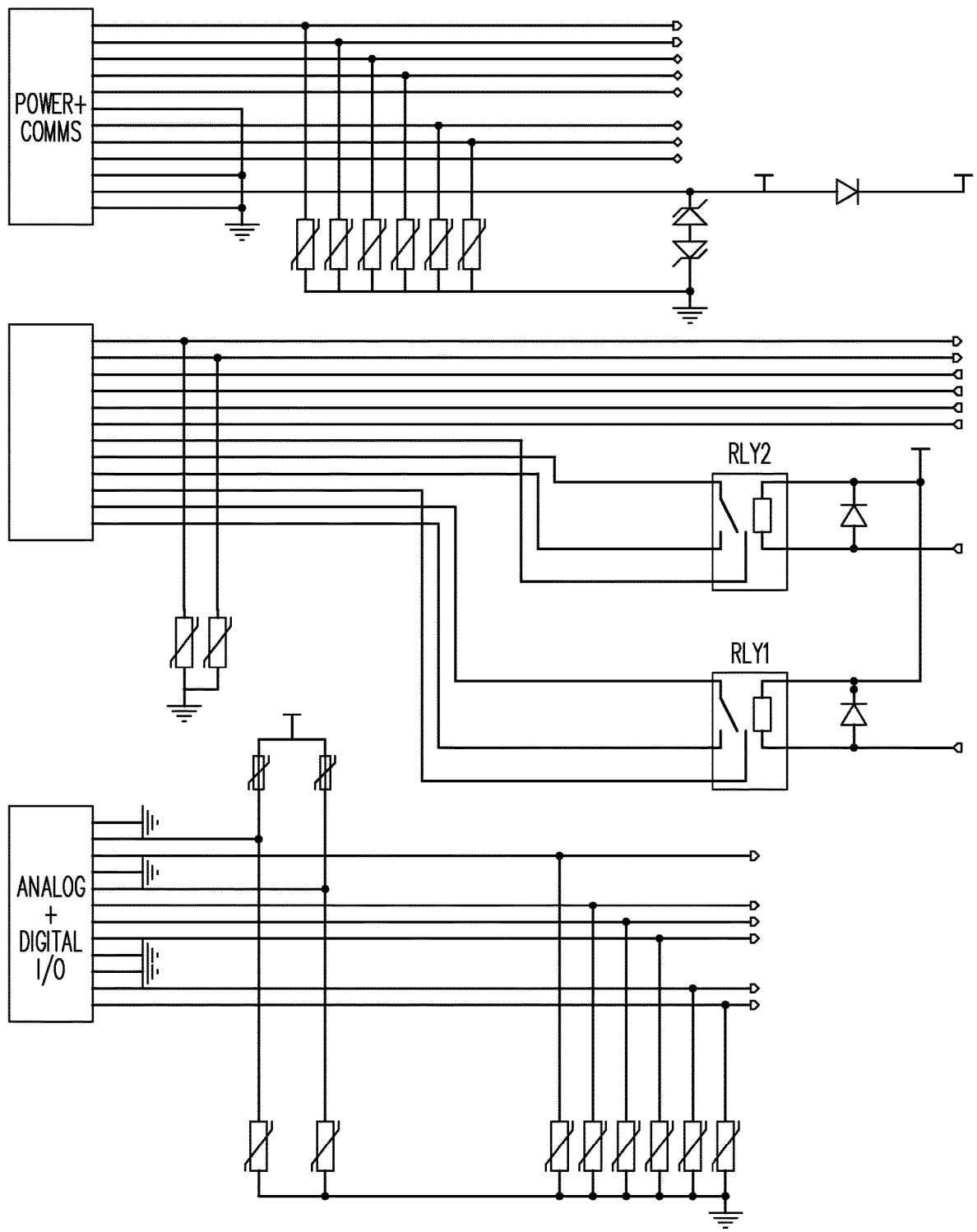
FIG. 3 is a schematic illustration of the external connectors and relays.
Figure 4:
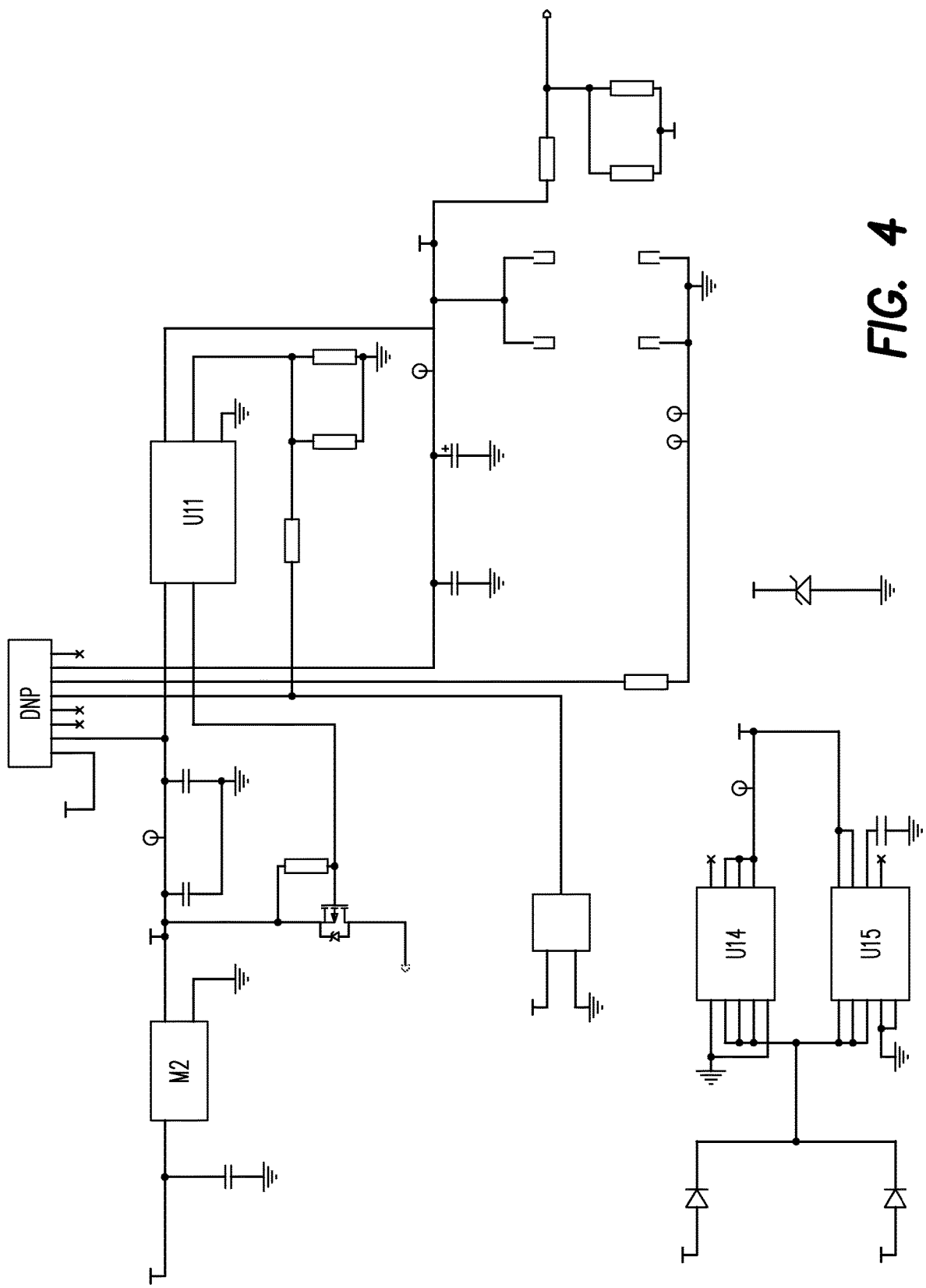
FIG. 4 is a schematic illustration of the power supplies and battery charger.

The GSC includes two relays RLY1 and RLY2, which are depicted in FIG. 3. In one embodiment, "Type C" (SPDT)

relays can be employed. A first of these relays is controlled remotely, and typically employed to override a local on/off panel switch. In the event that a monitored piece of equipment has been left, inadvertently or otherwise, in a powered-down state, the GSC can force the system into being powered and subsequently access any connected equipment e.g., a generator control panel.

An available second relay can be utilized on systems employing a fuel polisher. Regardless of whether the GSC is able to communicate with the remote server 14, it can energize this second relay to power the fuel polisher system. The duration of the process, and time between polishes, is configured via the remote server, but unlike known configurations, these settings are retained in memory between power cycles.

2.4 Digital Outputs

Four digital outputs are available, each of which is independently controlled via the remote server. In one embodiment, each output is capable of switching up to 36 Vdc at 5 A to "ground." Such outputs are commonly referred to as "Low Side," "NPN" and "Ground Output."

Figure 6:
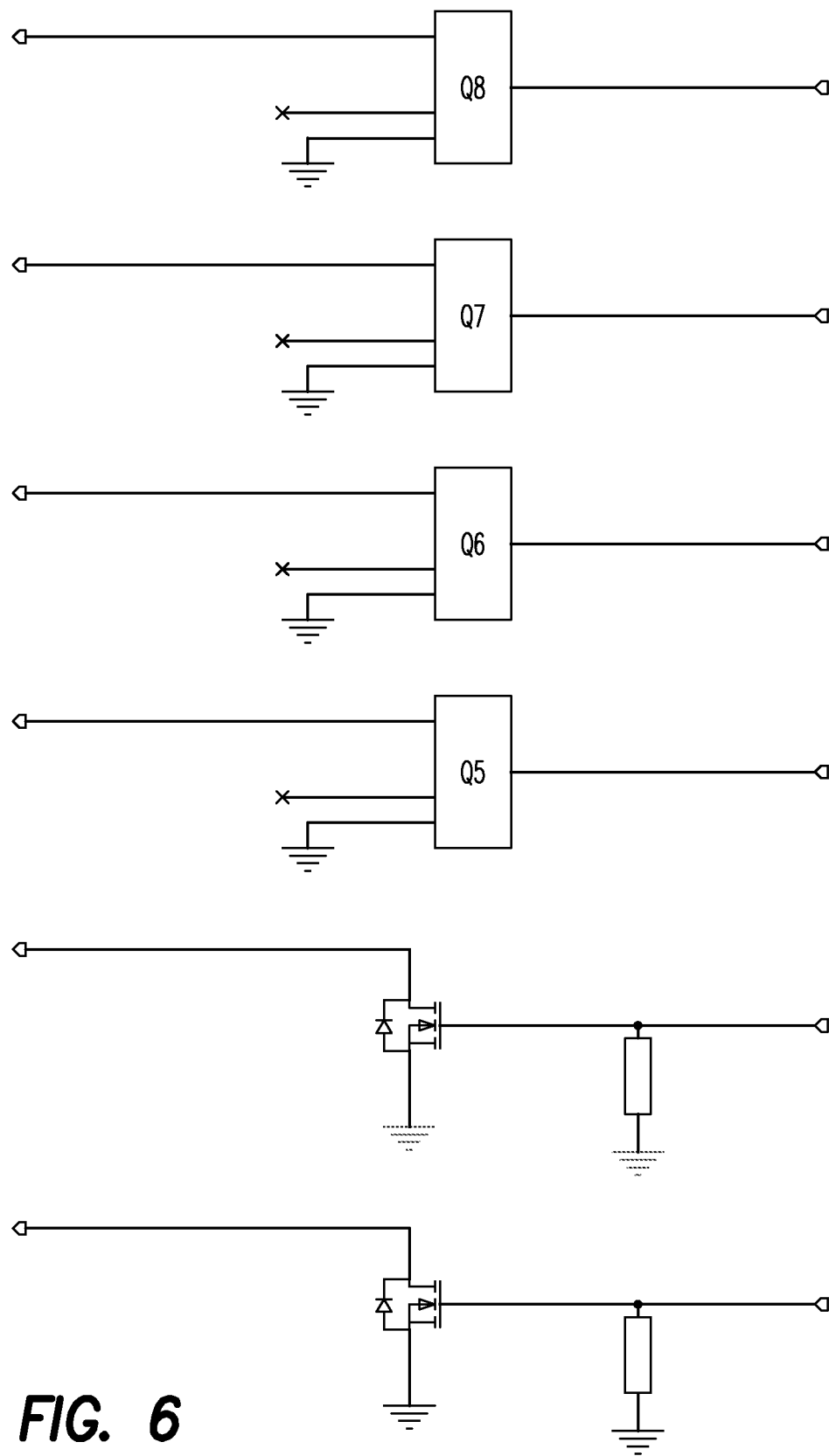
FIG. 6 is a schematic illustration of the Low side (Digital Out) and relay drivers.
Figure 7:
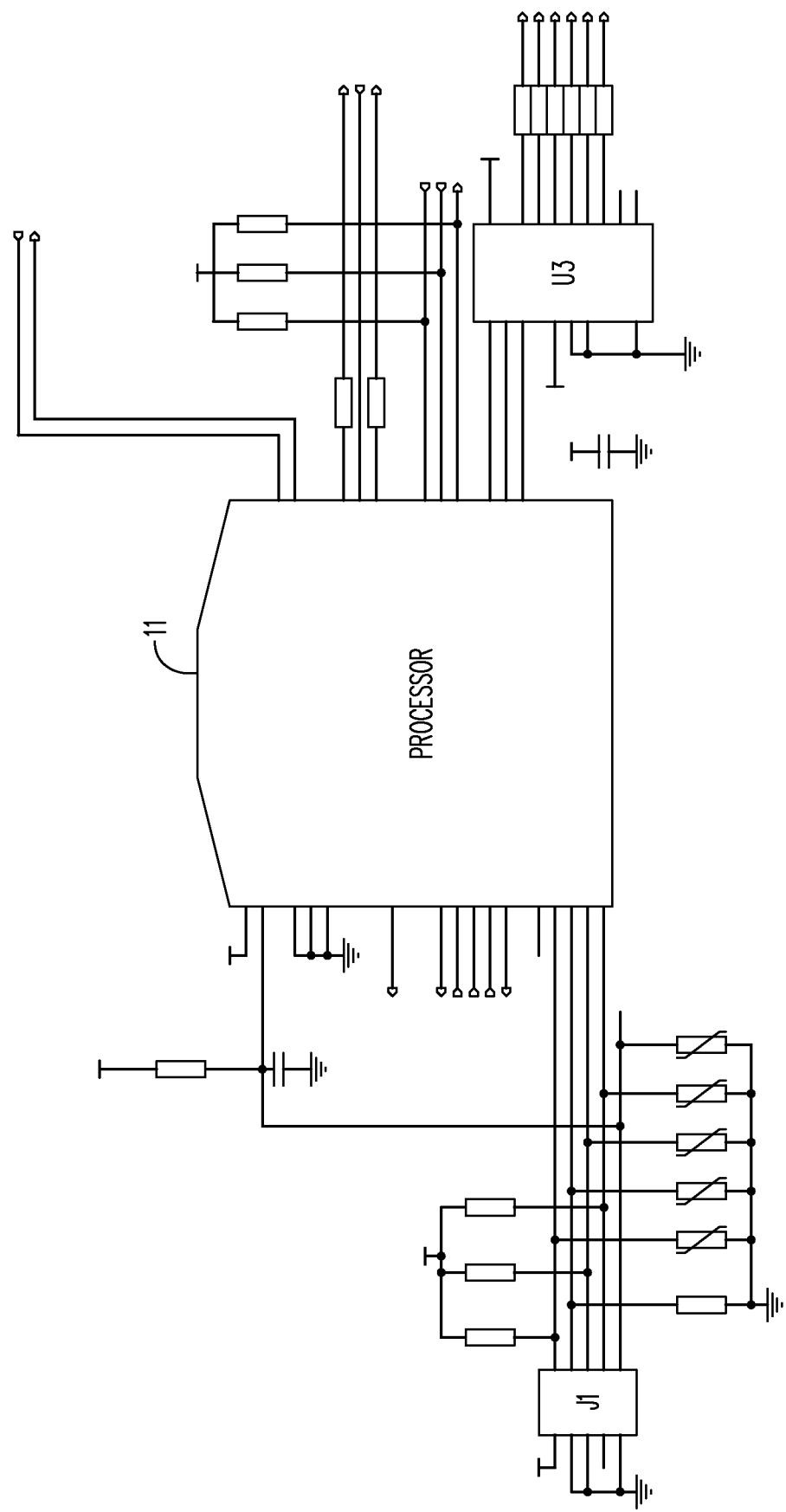
FIG. 7 is a schematic illustration of the processor and associated interfaces.

The relays and digital outputs are controlled by low-side drivers 20, which are illustrated in detail in FIG. 6.

2.5 Digital Inputs

In the illustrated embodiment, four digital inputs 22 are supported by the GSC, and the state of each input is reported to the remote server 14. By default, each input can detect the closure of a switch which is wired to ground. Such an input is commonly referred to as "Low side," "NPN," or "Ground Input." Should a "High side," "PNP," or "Battery Input" type be desirable, this can be optionally included.

2.6 Analog Inputs

Multiple analog inputs 24 are available and configured for monitoring industry-standard "4-20 mA," "0-5 mA" and "0-10 mA" senders. A voltage type input (e.g., 0-10V) be can also be included.

2.7 CAN J1939

Figure 10:
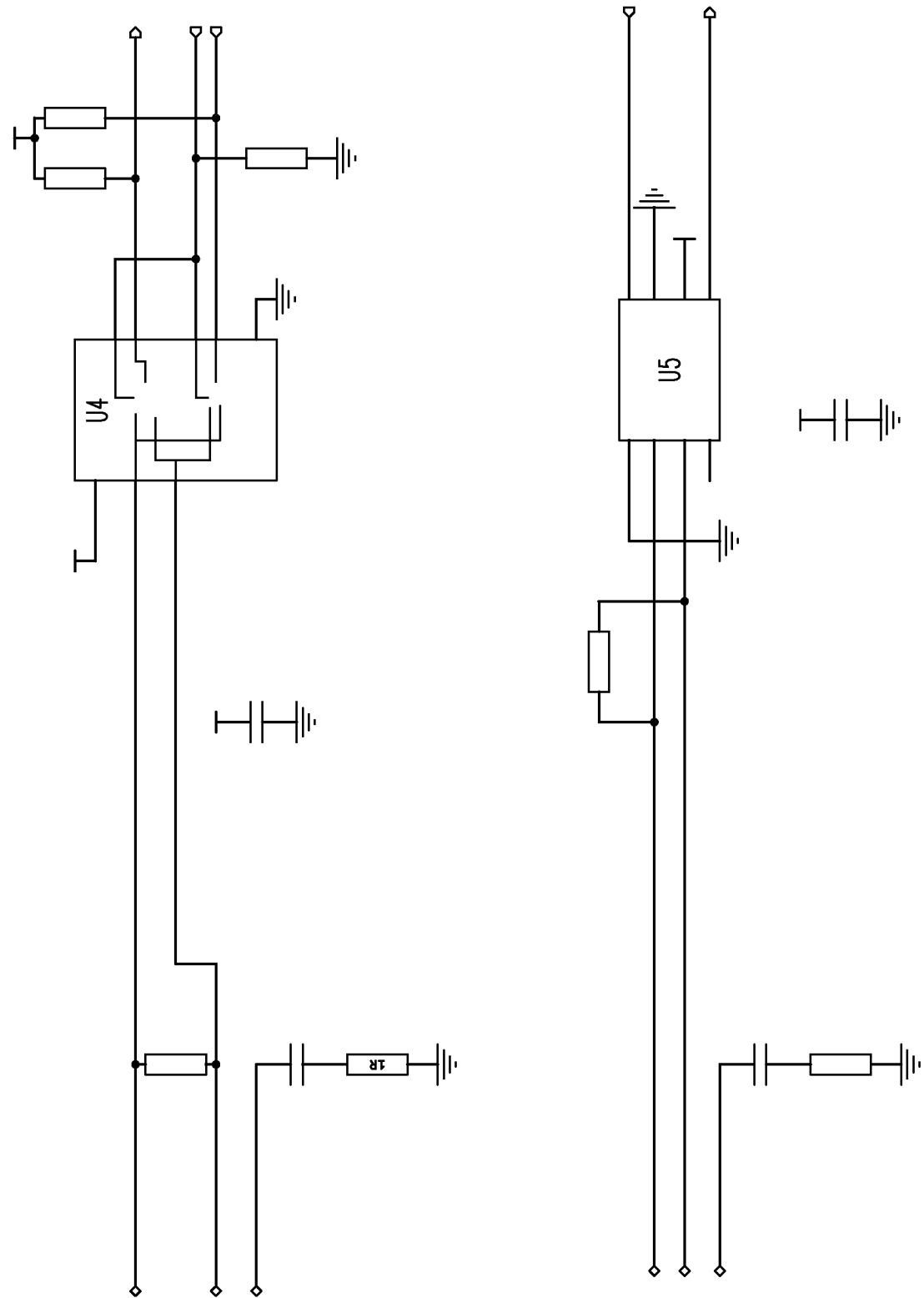
FIG. 10 is a schematic illustration of the RS485 and CAN interfaces.
Figure 11:
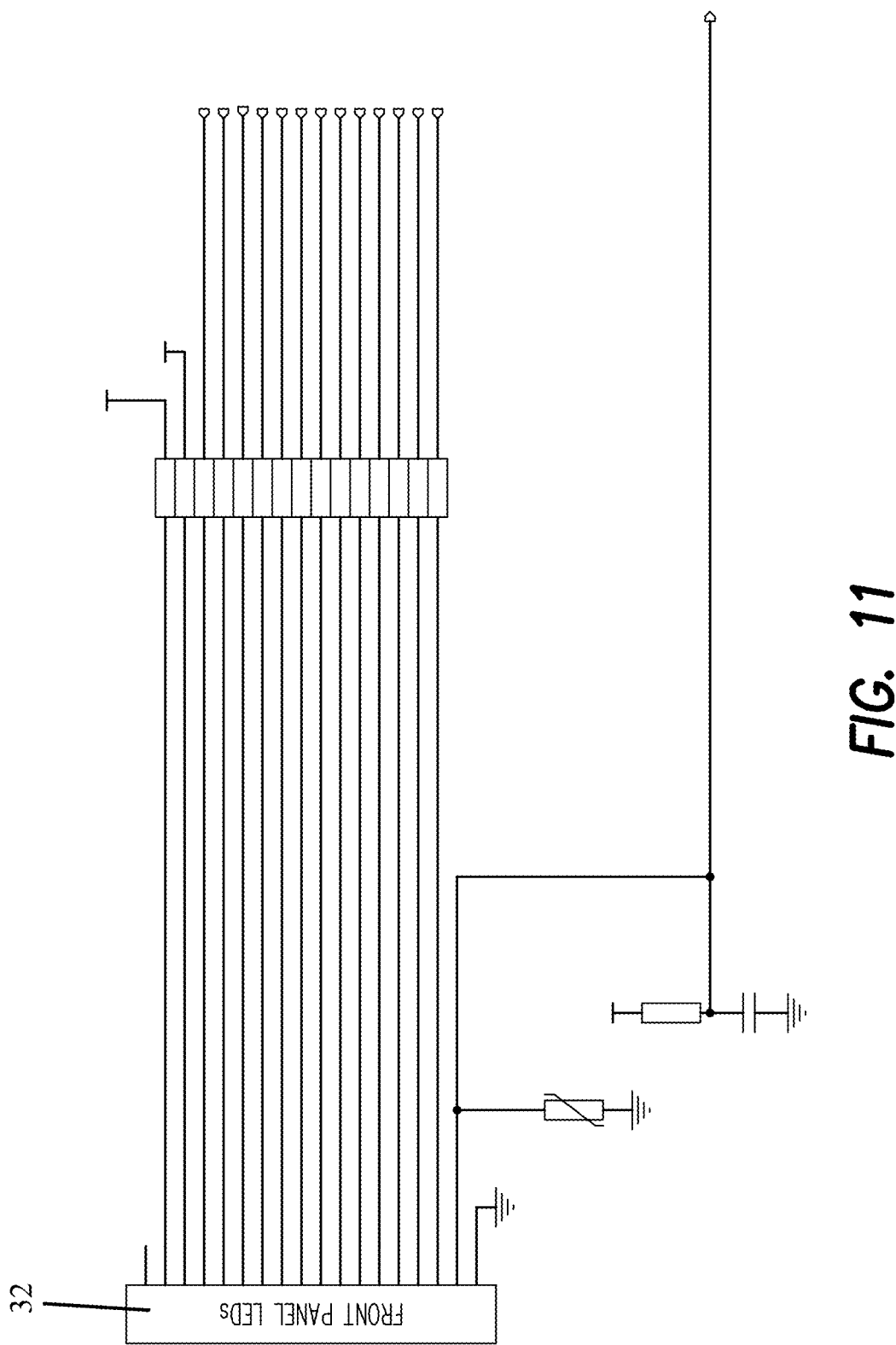
FIG. 11 is a schematic illustration of the front panel LED connection.
Figure 12:
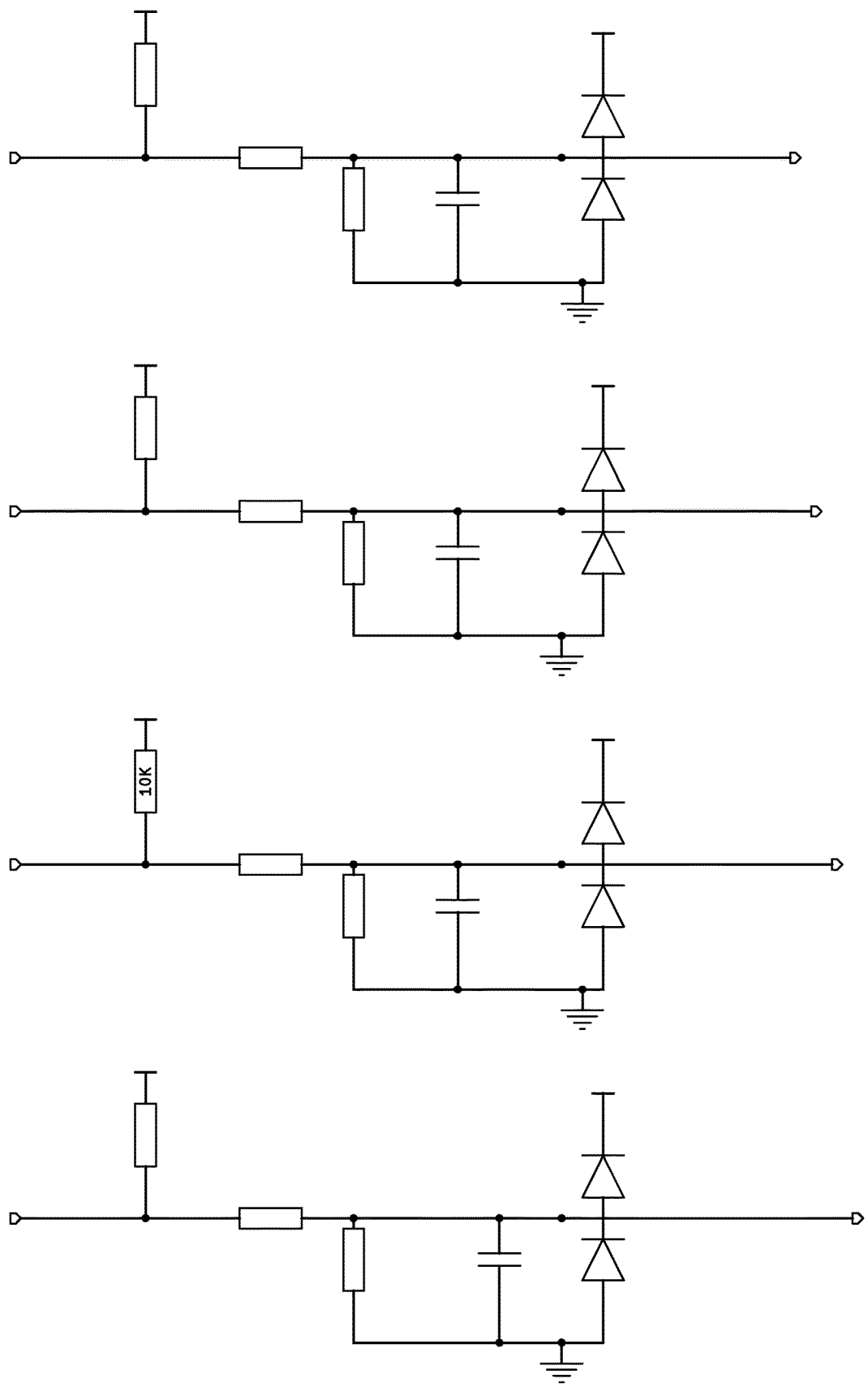
FIG. 12 is a schematic illustration of the Digital Input Signal conditioning.
Figure 13:
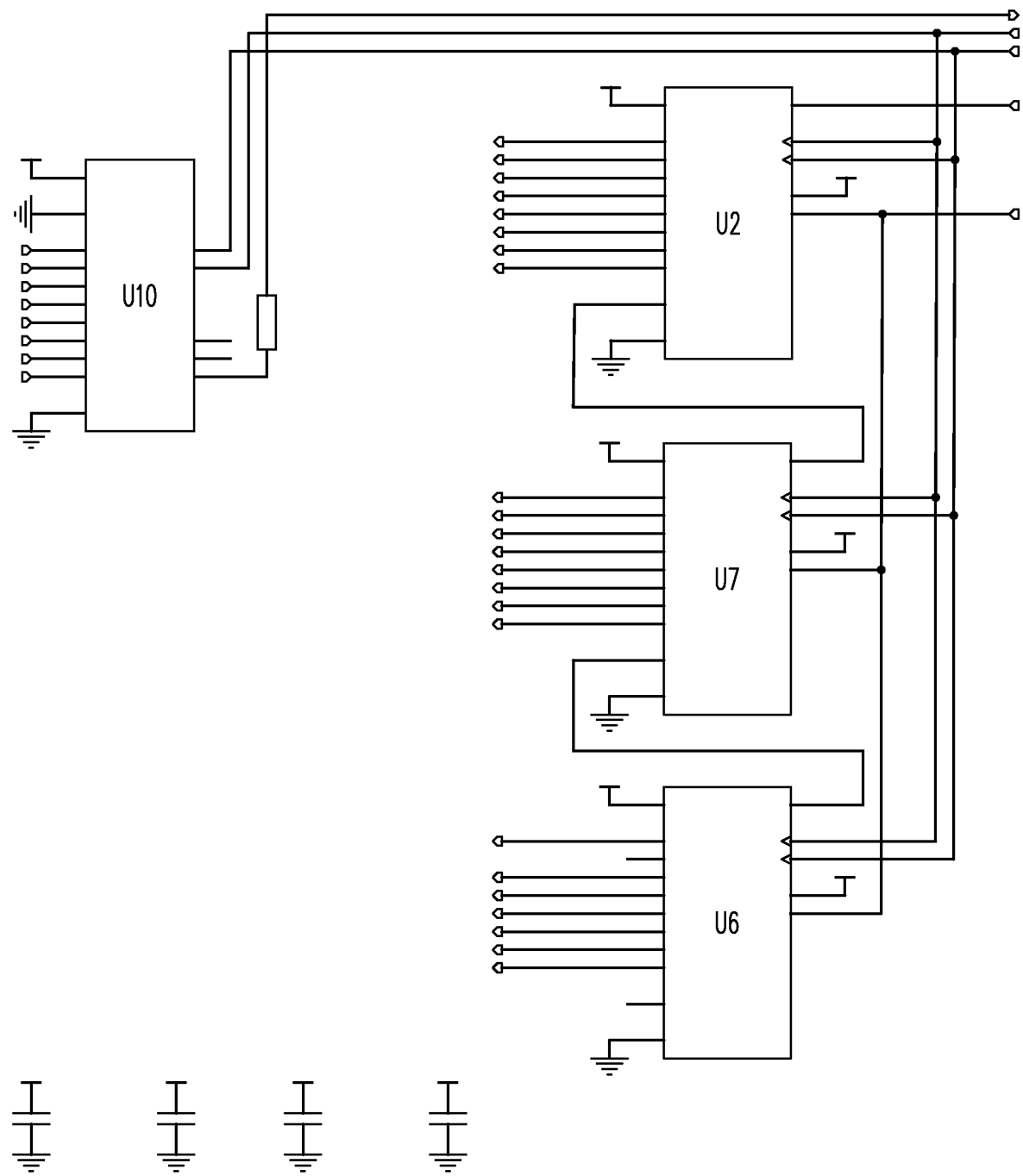
FIG. 13 is a schematic illustration of the general purpose Input/Output Expansion.
Figure 14:
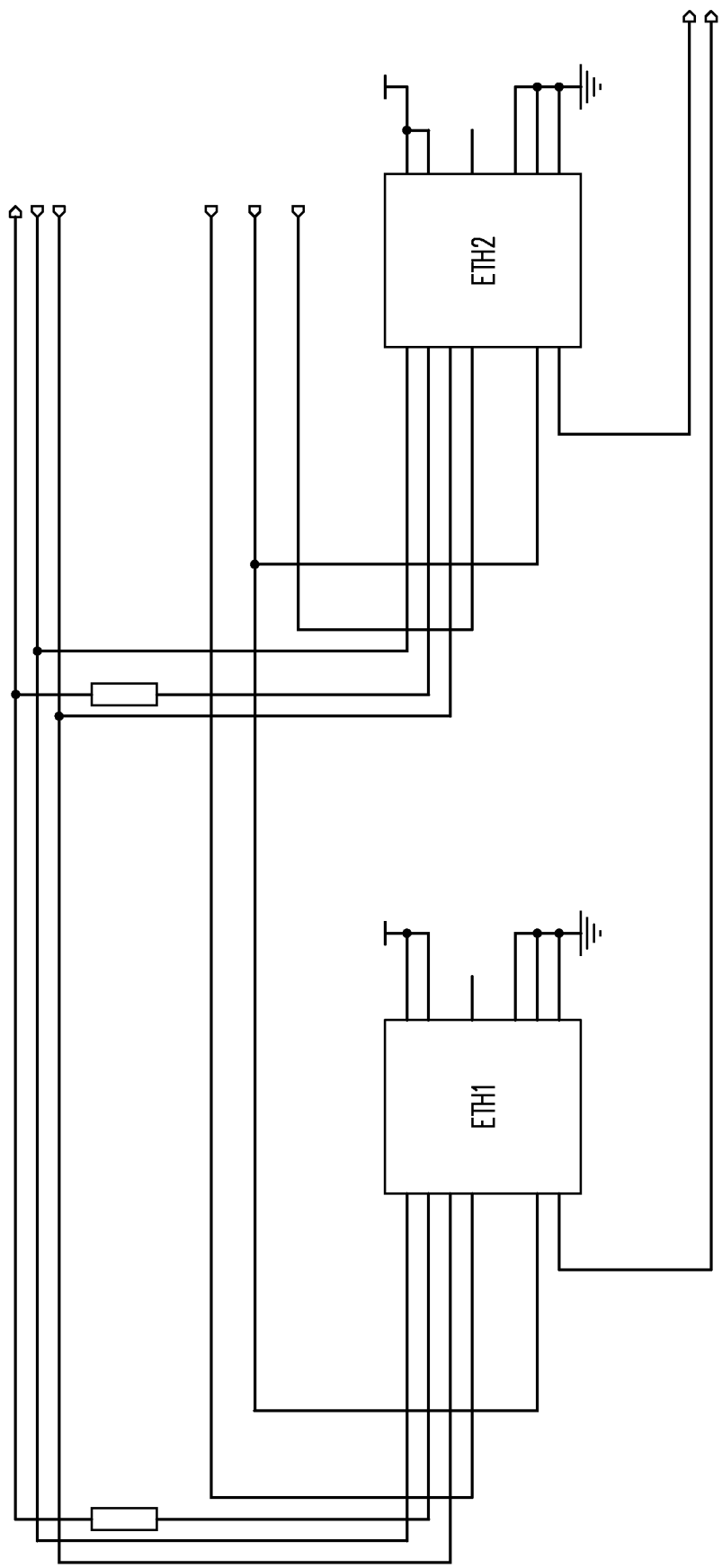
FIG. 14 is a schematic illustration of the Ethernet interfaces.
Figure 15:
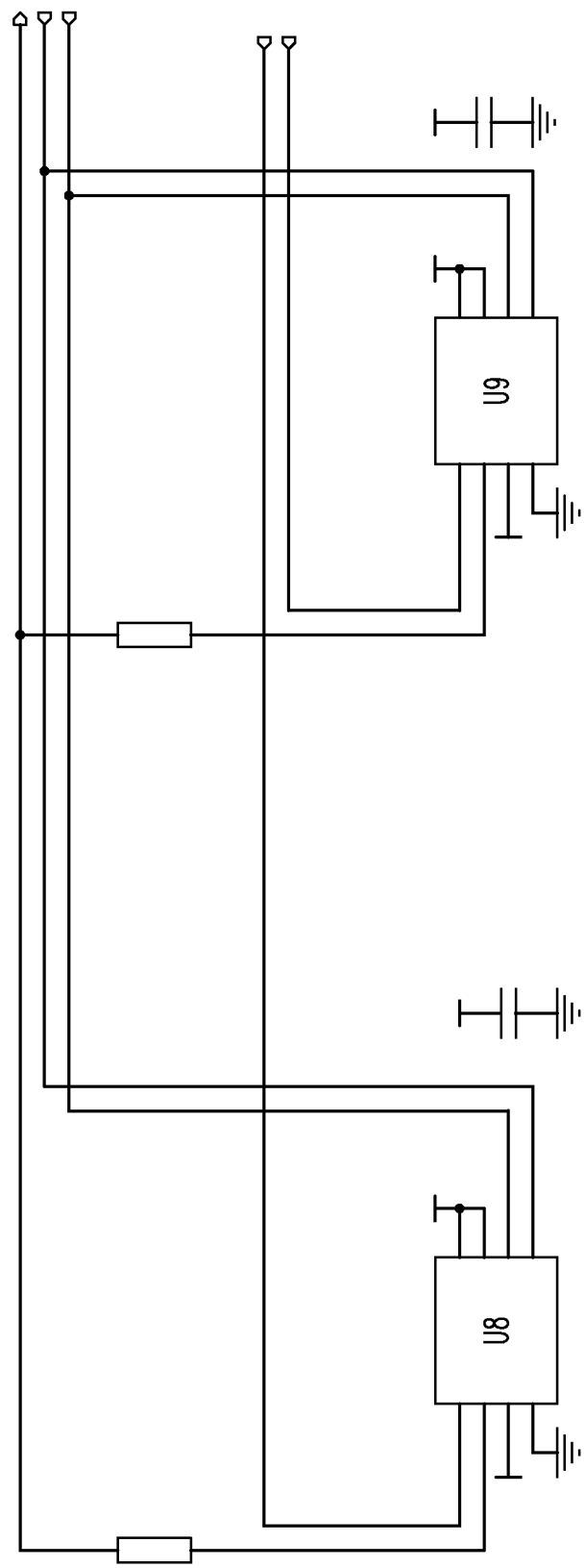
FIG. 15 is a schematic illustration of the Flash and RAM memory expansion.

To facilitate communication with engine control units (ECUs), a CAN interface 26 can be employed. An example of such an interface is depicted in FIG. 10. In one embodiment, the processor employs SAE J1939 standard networking to communicate via the interface. Interaction with the ECU is configured using settings retrieved from the remote server 14 and can be used to monitor basic engine status such as speed, oil pressure, engine hours, active and stored faults, etc. The CAN interface is also able to send data to the engine such as may be required to control engine speed, clear fault codes, etc.

2.8 Ethernet

Figure 8:
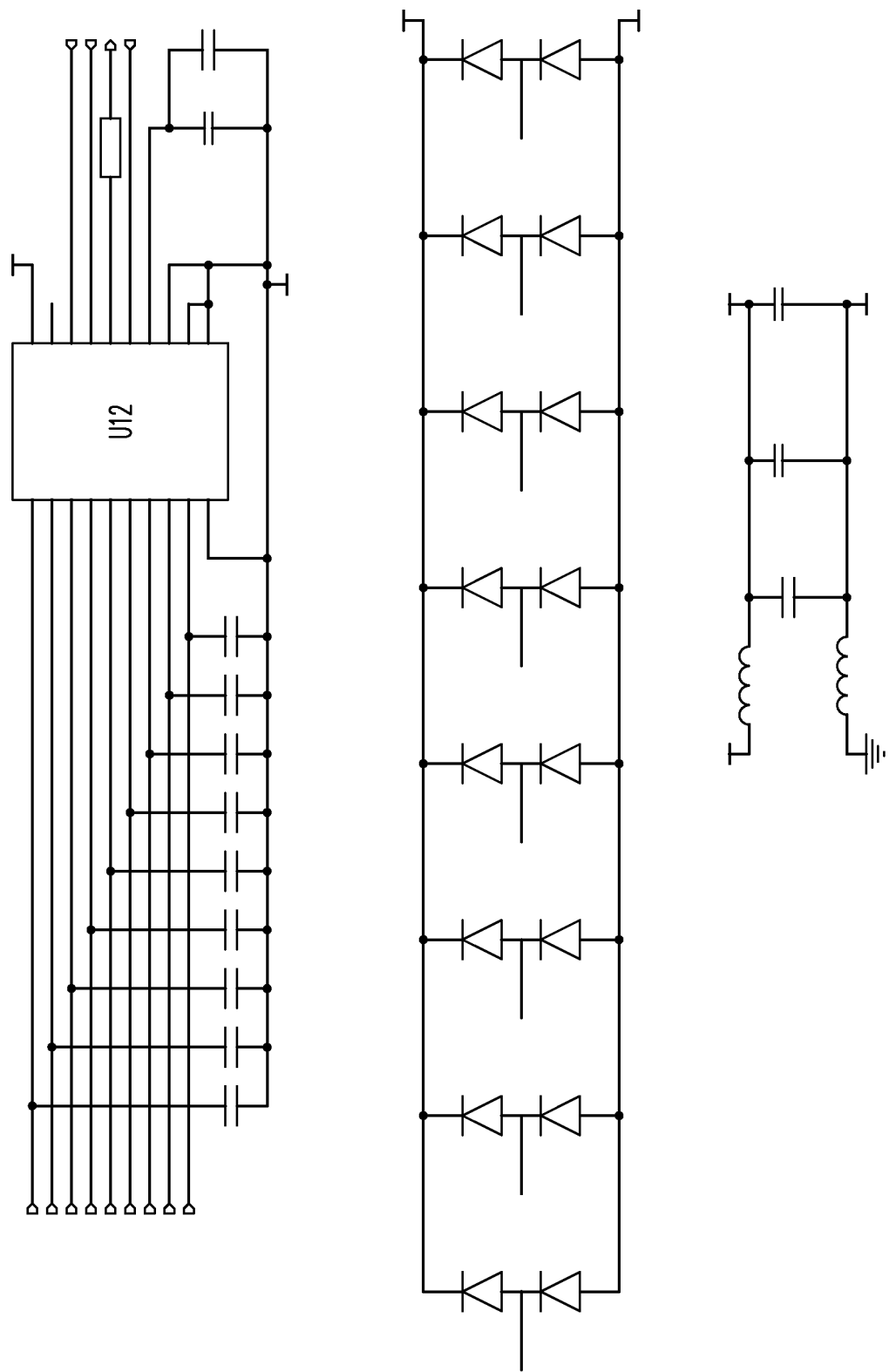
FIG. 8 is a schematic illustration of the Analog to Digital Converter.

One or more Ethernet interfaces can be employed on the GSC. Examples of such interfaces are depicted in FIG. 8. One Ethernet interface can function to communicate with systems that employ "MODBUS TCP" as means of transferring data. In this instance, the GSC repeatedly polls devices on the Ethernet network requesting data as defined by the remote server.

A second interface is available for communicating on a separate or isolated Ethernet network. This might typically be required when multiple gateways are required to communicate with each other (such as that required for generator synchronization, or to share a high-cost communication network such as satellite), or where networks used for control and lower-priority traffic are to be kept separate.

2.9 RS485

An RS-485 interface, also depicted in FIG. 10, provides for connection to equipment which uses the "Modbus RTU" over RS485. In such a configuration, the GSC is considered a MODBUS "Master" and is responsible for requesting data from each of the devices on the RS485 network. RS485 offers a number of benefits, such as communication distance and robustness against interference.

3 Installation

3.1 Magnet Mounts

The GSC can be supplied with four pre-installed magnetic mounts to facilitate direct installation on any ferrous (magnetic) surface without use of additional fasteners. Preferably, each magnet is sufficiently strong to require up to 181*b* of force to detach from a rust-free and unpainted iron plate. The securing force may be reduced on other ferrous and/or painted surfaces. If use of magnet mounts is deemed insufficient for secure and reliable mounting, they can be removed and an alternative manner of fastening used.

3.2 Screw Mount

Figure 20:
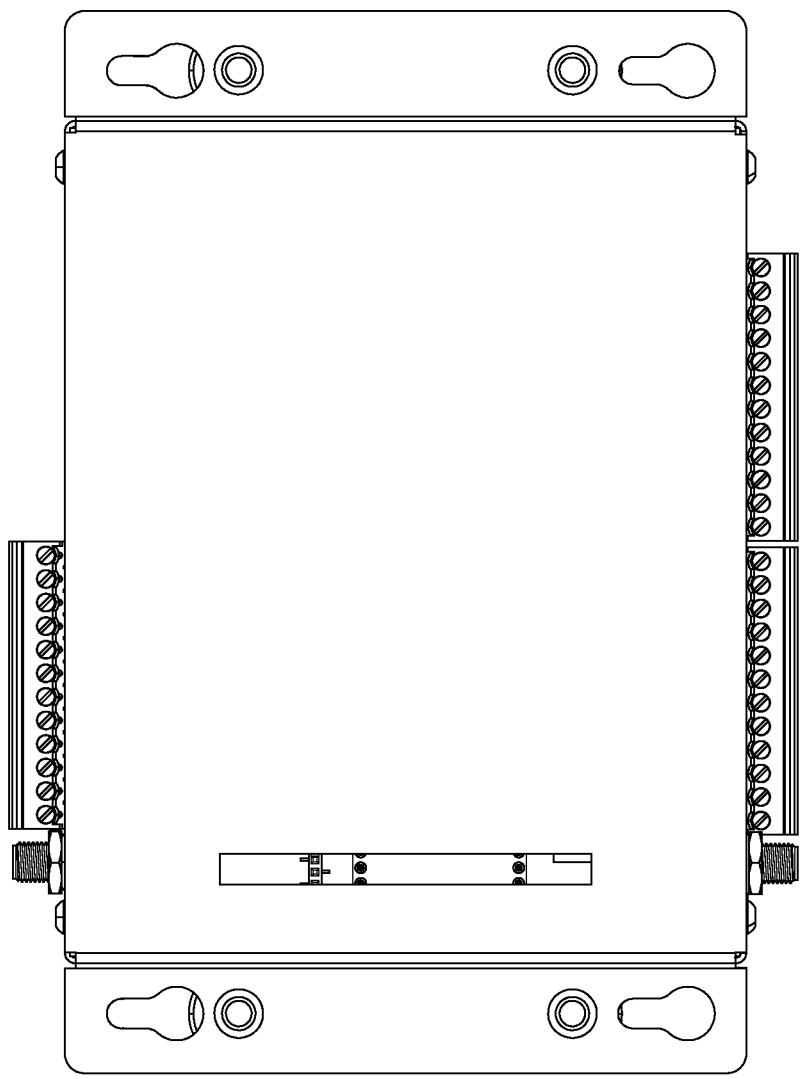
FIG. 20 is a front plan view of an exemplary enclosure for the GSC gateway.

If the magnet mounts are deemed insufficient to secure the GSC to a surface, the unit can be mounted using four keyhole slots in the enclosure illustrated in FIG. 20, and four suitable screws.

3.3 Antenna Mount

The GSC utilizes an antenna for both the network connection and for receiving the signals from the GPS satellites. The preferred mounting position for the supplied antenna is outdoors with a clear sight to the sky. If mounted indoors, the reliability of both the GPS and cell connection will depend on the construction materials used for the building or other structure in which the gateway is located.

There are three main methods of mounting the antenna, two of which require the use of an antenna bracket:

A first mounting method is predominantly suitable for use in trailer-mounted applications. A hole of suitable diameter, e.g., ½-inch, can be made in the roof of the trailer, and the antenna leads fed through the hole. A self-adhesive gasket can be exposed on the underside of the antenna, and the antenna subsequently secured using the adhesive gasket, a shake-proof washer, and a securing nut.

In a second approach, an antenna bracket along with two suitable fasteners can be used to attach the antenna to an outside vertical surface of the structure in which the GSC is located.

In a third approach, an antenna bracket along with two suitable U-Clamps can be used to attach the antenna to a pole.

3.4 Power

The GSC utilizes an external power source 30 of between 10 and 32V D.C. The GSC can be suitably protected to be powered from a 12 or 24V battery if used in an off-highway application.

3.5 Cell and GPS

The antenna can be connected to the GSC using two coaxial cables. Both cables are preferably contained within a single shroud, except for the last foot, for physical protection. At the end of each cable, two "SMA" type connectors can be employed. Each connector is preferably marked to indicate its associated transmission medium, e.g., "GPS" and "LTE" (or "CELL"). Each is connected to an appropriate socket on the gateway.

3.6 Ethernet

Connections using either of the Ethernet interfaces 28 can employ Cat 5 cable with a maximum length of 300 feet.

3.7 RS485 MODBUS

The RS485 interface 26 utilizes a connection of one twisted pair cable, a ground reference and an optional "shield."

3.8 CAN J1939

Connection between the gateway and the generator ECU utilizes a cable conforming with the SAE J1939 specification.

4 Front Panel Indicators

Indicators 32 can be installed in the front panel of the GSC to identify operational states of the unit. In one embodiment, 15 front panel indicators can be employed. Their functions can be as follows:

| LED | Color | Description |
|---|---|---|
| Supply | Green | External power is present |
| System On | Green | System is active |
| Charging | Green | Internal batteries are being charged |
| GPS | Green | Flashing = GPS Searching, Steady = GPS locked |
| RS485 → | Green | RS485 Transmit |
| RS485 ← | Yellow | RS485 Receive |
| CAN → | Green | RS485 Transmit |
| CAN ← | Yellow | RS485 Receive |
| ETH2 → | Green | RS485 Transmit |
| ETH2 ← | Yellow | RS485 Receive |
| ETH1 → | Green | RS485 Transmit |
| ETH1 ← | Yellow | RS485 Receive |
| Cell Reg | Green | System registered on local cell network |
| Fault | Red | System is malfunctioning |
| Aux | Green | For future use |

5 Cloud-Based Configuration

At power on, the GSC attempts to connect to the nearest cellular network 16, ensure it has a connection to the Internet, and request configuration data from the remote server 14. The following sections describe the technology and methods used.

5.1 MQTT

At the simplest level, the GSC sends data it has collected from the equipment it is monitoring to the remote server 14. In one implementation, the MQTT protocol3 is used, and the data is received by a "broker." The broker is responsible for forwarding the data to other services, such as an online dashboard, or a database used for storing historic data.

The GSC can also receive data from the broker, which enables the remote server to control and configure the behavior of the equipment of interest.

In preferred cases, the data is represented using one or more messages that are in the JSON data format.

The first step in configuring the system is defining what is to be sent from the gateway to the broker. This takes the form of a JSON message with each element describing the following:
  header defining the format version of the main payload;
  list of each item to be sent, each of which defines:
    a human-readable identifier,
    how the value is to be interpreted, e.g., as a floating point number, a string of characters, etc.
  The maximum rate in milliseconds that the value should be sent;
  The category expected by the broker to which this data belongs;
  A mode defining how a compare value should be used when determining if the value has changed; and
  A value which determines the amount of change necessary to cause a transmission of the new value.

As an example, using just two parameters, the JSON string shown in FIG. 16 defines two exemplary parameters the gateway must send to the broker whenever they change 5% and 0.5%, respectively.

5.2 MODBUS TCP

In a system where the GSC fetches data from a device supporting MODBUS TCP, the following fields are specified, as shown in the example of FIG. 17:
  A header defining the format version of the main payload.
  The ethernet interface of the gateway to use.
  A list of devices which are to be scanned. Each device entry contains:
    the IP address of the device
    the port used by the device's modbus service
    a slave address
    a session number
    a list of registers to be read. Each register definition contains:
      a human-readable identifier
      the type of modbus register to read
      the data format used by the register
      a scaling factor to be applied to the read value
      an offset to be added to the read value
      the lowest bit of a bit-field value (when applicable)
      the number of bits to use (when applicable)
  Such information is stored at the server and takes the form of an array of nested JSON strings.

5.3 MODBUS RTU

In a system where the GSC is to fetch data from a device supporting MODBUS RTU (which uses the RS485 interface), the following fields are specified in the example of FIG. 18:
  A header defining the format version of the main payload.

A list of devices which are to be scanned; each device
  entry contains:
    the MODBUS address, and
    a list of registers to be read.
Each register definition contains:
a human-readable identifier
the type of modbus register to read
the data format used by the register
a scaling factor to be applied to the read value
an offset to be added to the read value
the lowest bit of a bit-field value (when applicable)
the number of bits to use (when applicable)
Such information is stored at the server and takes the form of a nested array of JSON strings.

5.4 J1939

In a system where the GSC is to fetch data from a device, e.g., an engine controller, supporting the J1939 set of standards (which uses the CAN interface), it is the following fields can be specified as shown in the example of FIG. 19:
A header defining the format version of the main payload.
A list of devices which are to be scanned. Each device
  entry contains:
    the J1939 CAN address, and
    a list of PGNs to be read.
Each PGN definition contains:
a human-readable identifier
the PGN number
a scaling factor to be applied to the read value
an offset to be added to the read value
the lowest bit of the 8 byte payload to use
the number of bits to use
Such information is stored at the server and takes the form of a nested array of JSON strings.

6 Enclosure

Figure 21:
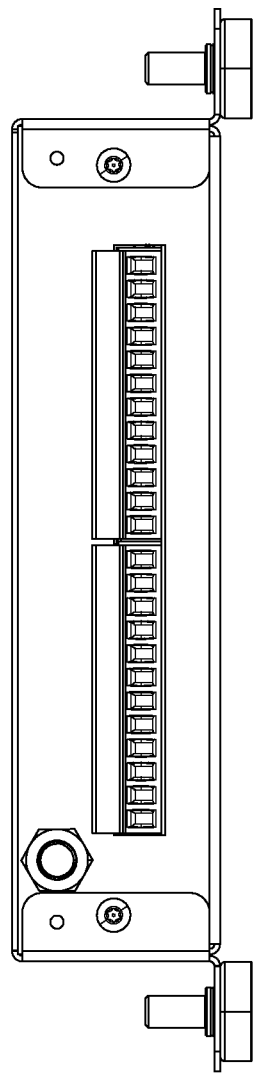
FIG. 21 is a bottom view of the exemplary enclosure.

An exemplary two-part enclosure manufactured from 18-gauge galvanized steel is shown in FIGS. 20 and 21. To further protect the enclosure from corrosion, it can be e-coated with an automotive grade finish. The enclosure base holds the PCB and connectors for the antenna. Four security bit screws secure the enclosure cover to the base. The design uses a minimum of fasteners, yet is extremely robust and secure. For additional security, the lid can also be riveted to its base.

Descriptions of the labeled components appearing in FIGS. 4-10, 13 and 15 are presented in the following table:

| FIG. | Label | Description |
| --- | --- | --- |
| 4 | DNP | Adjustment of matching between antenna and cell modem |
| 4 | M2 | Ethernet interface |
| 4 | U11 | Level shifter |
| 4 | U14 | Address decoder |
| 4 | U15 | Flash memory |
| 5 | J3 | SIM card socket |
| 6 | Q5 | MOSFET switches |
| 6 | Q6 | MOSFET switches |
| 6 | Q7 | MOSFET switches |
| 6 | Q8 | MOSFET switches |
| 7 | J1 | JTAG programming header |
| 7 | U3 | USB-to-serial adapter |
| 8 | U12 | 3.3 V regulator |
| 10 | U4 | Cell modem |
| 10 | U5 | Transceiver |
| 13 | U2 | Shift register |

-continued

| FIG. | Label | Description |
| --- | --- | --- |
| 13 | U6 | Shift register |
| 13 | U7 | Shift register |
| 13 | U10 | Overvoltage detector |
| 15 | U8 | 5 V regulator |
| 15 | U9 | Battery charger controller |

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

What is claimed is:

1. A general systems controller gateway that provides remote monitoring and control of an electrical machine, comprising:
  a processor;
  a digital data input communication interface for directly connecting the processor to a control unit of the electrical machine, to obtain data pertaining to operating parameters of the electrical machine; and
  a digital data output communication interface for directly connecting the processor to the control unit of the electrical machine, to convey signals for controlling the operation of the electrical machine;
  wherein:
  in response to receiving operating parameter data via the digital data input communication interface, the processor autonomously operates to:
    (i) determine whether the received operating parameter data is within specified limits, and
    (ii) in response to receipt of data indicating that an operating parameter is outside a specified limit, send commands via the digital data output communication interface to the control unit of the electrical machine, to perform an operation for correcting the value of the parameter;
  further comprising a wireless communication interface via which the processor communicates with one or more remote servers to provide status information pertaining to the electrical machine, and receive setting data from a remote server for configuring the operation of the machine.

2. The general systems controller gateway of claim 1, wherein the digital data input interface comprises a plurality of inputs, each of which is associated with a respective switch of the electrical machine, and provides an indication of the state of the respective switch.

3. The general systems controller gateway of claim 1, wherein the digital data output interface comprises a plurality of outputs, each of which switches between two voltage levels to control the electrical machine.

4. The general systems controller gateway of claim 1, wherein the gateway further includes a Controller Area Network (CAN) interface for communicating with the control unit of the electrical machine via the input and output interfaces, to monitor indicators of the status of the machine, and to send data to control the operation of the machine.

5. The general systems controller of claim 4, wherein the CAN interface communicates via the SAE J1939 networking standard.

6. The general systems controller gateway of claim 4, wherein communications via the CAN interface between the electrical machine control unit and the gateway are conducted in accordance with the SAE J1939 protocol.

7. The general systems controller gateway of claim 1, wherein the gateway further includes an interface that conforms to the RS-485 standard, for communication with one or more electrical machine control units.

8. The general systems controller gateway of claim 1, wherein the wireless communication interface is a cellular network modem.

9. The general systems controller gateway of claim 8, wherein the modem has the capability to communicate with a satellite network to obtain location information.

10. The general systems controller of claim 9, wherein the satellite network comprises at least one of a GPS network and a Glonass network.

11. The general systems controller gateway of claim 1, wherein the wireless communications interface is an Ethernet interface.

12. The general systems controller gateway of claim 1, further including at least one relay for forcibly changing a state of the electrical equipment.

13. The general systems controller of claim 12, wherein activation of the relay changes the on/off state of the electrical equipment.

14. The general systems controller of claim 1, wherein the digital data input communication interface comprises a plurality of inputs, and at least one of the inputs provides data regarding the open/closed state of a switch in the electric machine controller.

15. The general systems controller of claim 1, further including at least one analog input for conveying information pertaining to operation of the electrical machine.

16. The general systems controller of claim 1, further including an Ethernet interface for communication among multiple general systems controller gateways via an Ethernet network.

17. The general systems controller of claim 1, further including an RS-485 interface for communicating with devices via the MODBUS protocol.

18. The general systems controller of claim 1 further including a connector that provides a direct physical connection of the interfaces to corresponding terminals of an engine control unit.

* * * * *